(12) United States Patent
Mettes

(10) Patent No.: US 8,428,793 B2
(45) Date of Patent: Apr. 23, 2013

(54) AUTOMATIC DOWNLINK MESSAGING DURING EMERGENCY FLIGHT SITUATIONS

(75) Inventor: W. Jerry Mettes, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1276 days.

(21) Appl. No.: 11/831,317

(22) Filed: Jul. 31, 2007

(65) Prior Publication Data

US 2009/0037037 A1  Feb. 5, 2009

(51) Int. Cl.
  *G05D 1/00* (2006.01)
  *G05D 3/00* (2006.01)
  *G06F 17/00* (2006.01)
  *G06F 19/00* (2006.01)
  *G08B 21/00* (2006.01)
  *B64C 13/18* (2006.01)

(52) U.S. Cl.
  USPC .............. 701/11; 701/14; 701/29.1; 701/32.7; 701/33.4; 340/945; 340/963; 244/76 R; 244/175

(58) Field of Classification Search .................. 701/1, 3, 701/4, 7–9, 11, 14, 29, 36, 207, 213, 300, 701/29.1, 29.2, 29.6, 31.4, 31.5, 32.3, 32.4, 701/32.7, 33.2, 33.3, 33.4; 340/945, 961, 340/963, 488–490, 971, 993, 994; 244/75.1, 244/76 R, 175, 194; 73/178 R
  See application file for complete search history.

(56) References Cited

U.S. PATENT DOCUMENTS

| 4,314,341 | A  | 2/1982 | Kivela |
| 6,085,145 | A  | 7/2000 | Taka et al. |
| 6,195,609 | B1 | 2/2001 | Pilley et al. |
| 6,282,417 | B1 | 8/2001 | Ward |
| 6,313,759 | B1 | 11/2001 | Musland-Sipper |
| 6,385,513 | B1 | 5/2002 | Murray et al. |
| 2006/0032987 | A1 | 2/2006 | Akers et al. |
| 2007/0150126 | A1* | 6/2007 | Crank ............................... 701/4 |

OTHER PUBLICATIONS

European Search Report for Application No. 08161395.2, mailed on Dec. 22, 2008.

* cited by examiner

*Primary Examiner* — Thomas Tarcza
*Assistant Examiner* — Edward Pipala
(74) *Attorney, Agent, or Firm* — Ingrassia Fisher & Lorenz, P.C.

(57) ABSTRACT

According to an example embodiment, a method includes receiving an emergency status signal indicating that an aircraft is in an emergency condition, formatting a downlink message in response to receiving the emergency status signal, the downlink message describing the emergency condition and an autopilot response to the emergency condition, and transmitting the downlink message to a controller of the aircraft.

19 Claims, 5 Drawing Sheets

AUTOMATIC DOWNLINK MESSAGING DURING EMERGENCY FLIGHT SITUATIONS

BACKGROUND

1. Technical Field

This disclosure relates generally to avionics, and more particularly, to automatic downlink messaging during emergency flight situations.

2. Description of the Related Art

An emergency situation may sometimes occur during the operation of the aircraft. For example, a sudden loss of cabin pressure at high altitude may cause the crew to lose consciousness. During such times, crew members may be unable to inform a ground controller of the nature of the emergency and what, if any, corrective steps have been taken to alleviate the emergency situation. Example embodiments may address this as well as other issues associated with the related art.

BRIEF DESCRIPTION OF THE DRAWINGS

Example embodiments are described with reference to the following drawings, where like numerals refer to like elements throughout. Furthermore, well-known features that are not necessary for an understanding of the example embodiments are not shown in the drawings in order to increase clarity. In order to emphasize certain features, the drawings may not be to scale.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-5 are merely illustrative and may not be drawn to scale.

Figure 1:
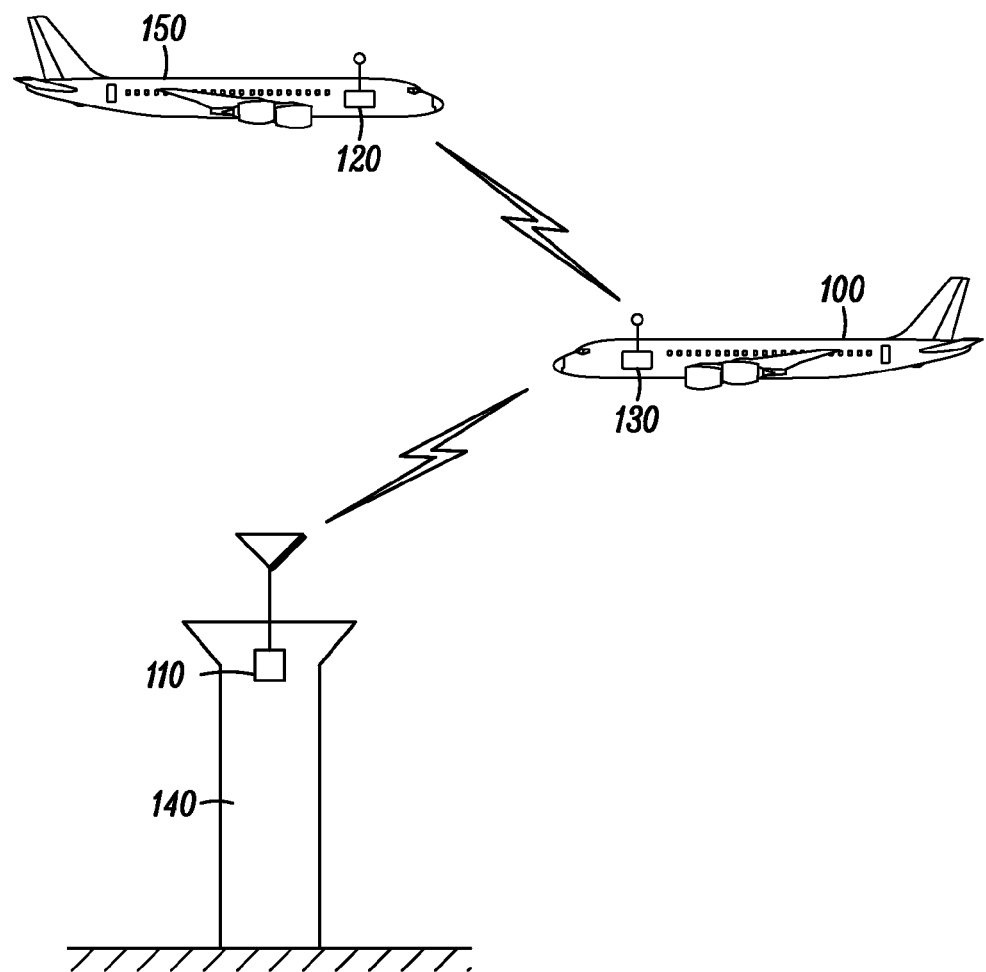
FIG. 1 is a perspective view of an aircraft in communication with a ground control station and an airborne warning and control station.

FIG. 1 is a perspective view of an aircraft 100 in communication with a ground control station 110 and an airborne control station 120. The airplane 100 includes a communications system 130 disposed therein. The communications system 130 sends and receives messages to and from the ground control station 110, which may be part of an Air Traffic Control (ATC) center 140. The communications system 130 sends and receives messages to and from the airborne control station 120, which may be part of an Airborne Warning And Control System (AWACS) aircraft 150. Aircraft 100 may communicate with a single ATC center or AWACS aircraft during a flight, but typically will communicate with multiple ATC centers and/or AWACS aircraft as the flight progresses.

Figure 2:
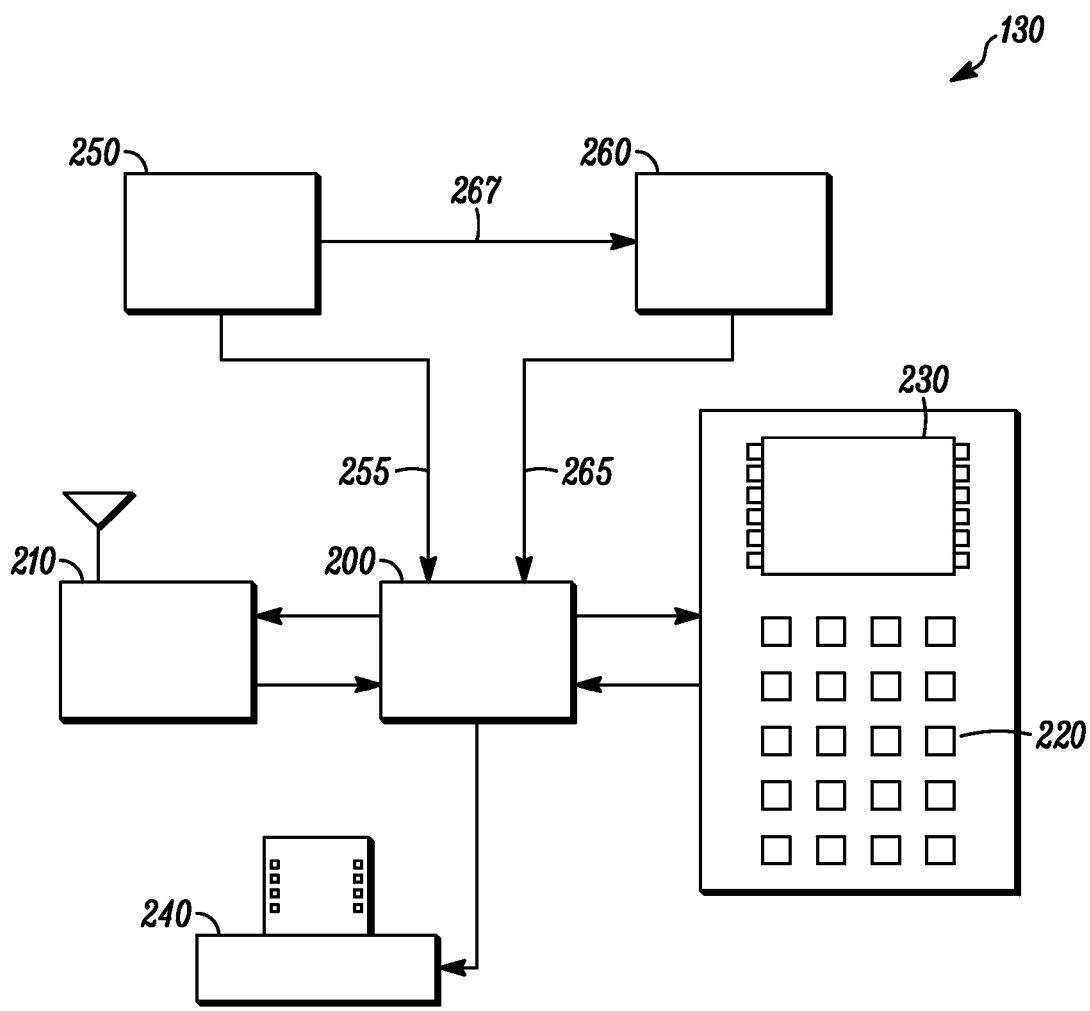
FIG. 2 is a schematic diagram that further illustrates the communications system of FIG. 1 in accordance with an example embodiment.

FIG. 2 is a schematic diagram that further illustrates the communications system 130 of FIG. 1 in accordance with an example embodiment. Communications system 130 includes a processor 200, which may include Read-Only and Random Access memory as well as data processing capability. A transceiver 210 is coupled to processor 200 and permits the processor to communicate with ground control station 110 or airborne control station 120. An input interface 220 and a display device 230 are further coupled to the processor 200. The input interface 220 permits an operator aboard aircraft 100 to input data to the processor 200, and a display device 230 permits communications system 130 to visually prompt and notify the operator of relevant data. A printer 240 is coupled to the processor 200 and permits the operator to selectively print copies of messages and data.

An emergency status indicator 250 and an autopilot 260 are coupled to the processor 200. The emergency status indicator 250 is operable to generate an emergency status signal 255 and transmit the emergency status signal to the processor 200, while the autopilot 260 is operable to generate an autopilot signal 265 and transmit the autopilot signal to the processor 200. In various embodiments capable of implementing an emergency descent mode (EDM) as described more fully below, emergency status indicator 250 may additionally provide a signal 267 to autopilot 260. As illustrated in FIG. 2, the components of communications system 130 may be interconnected but separate elements within the system. In alternative embodiments, two or more of the components may exist as a single unit.

Generally speaking, the emergency status signal 255 generated by the emergency status indicator 250 could be any signal that is generated in response to an emergency situation. Emergency situations include scenarios where one or more of the crew or passengers are incapacitated, or where a flight critical aircraft subsystem becomes damaged or non-responsive. For example, emergency situations may include, but are not limited to, a sudden loss of cabin pressure at high altitude that could result in the unconsciousness of the crew and passengers, a mechanical or electrical failure of a critical aircraft subsystem, severe turbulence, an unauthorized attempt to gain access to the flight deck, a disturbance in the passenger cabin, etc.

Figure 3:
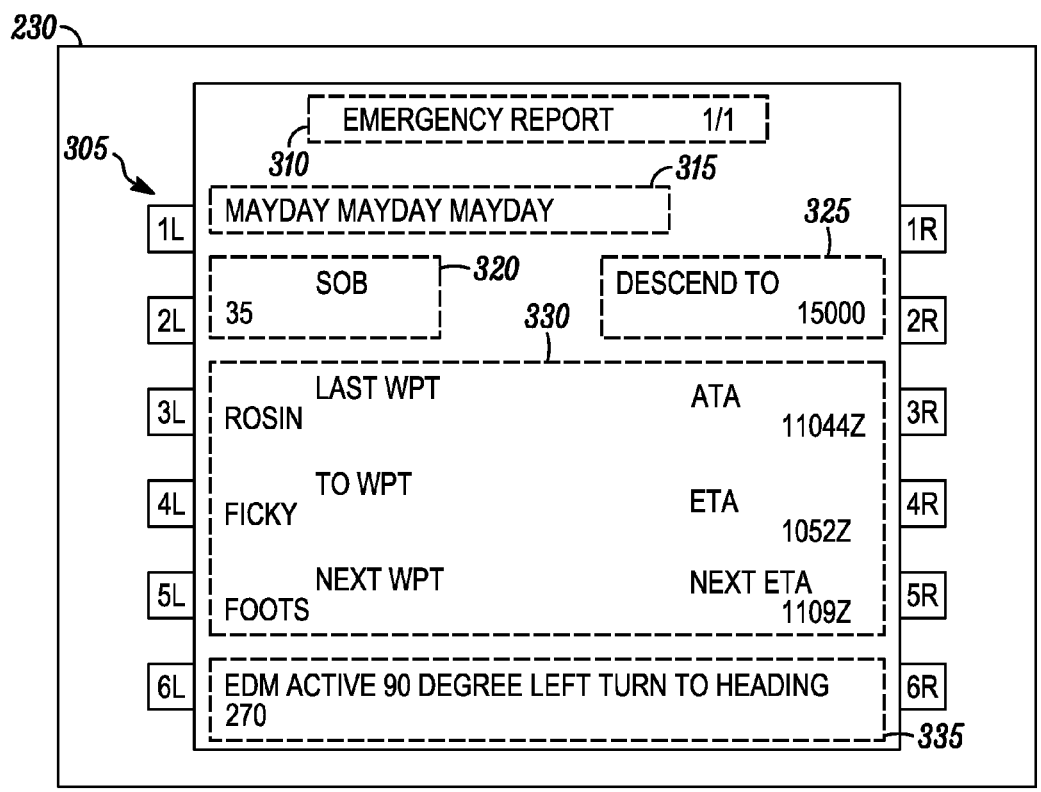
FIG. 3 illustrates an example output of the display device of FIG. 2 that shows an automatically prepared emergency CPDLC message according to an example embodiment.

According to one example embodiment, the emergency status indicator 250 may include an Emergency Descent Mode (EDM) monitor such as the one disclosed by element 171 in FIG. 3 of U.S. Pat. No. 4,314,341, although other components could be used as well. In some embodiments, the emergency status indicator 250 may be a complex circuit that monitors the status of many aircraft subsystems and flight parameters, and can generate an emergency status signal in response to any one of the subsystems or parameters entering an emergency situation. In other embodiments, the emergency status indicator 250 may be as simple as a switch that can be triggered by a member of the crew, or by the flight deck door being forced open. Given these teachings, numerous variations will be readily apparent.

A data-link program is loaded onto processor 200. In one embodiment, the data-link program may be a Controller-Pilot Data Link Communication (CPDLC) program. The CPDLC program enables the operator to communicate electronically with ground control station 110 or airborne control station 120 by guiding the operator through a series of screen configurations or displays that either elicit flight information from the operator or notify the operator regarding flight information. Examples of the screen configurations or displays that may appear on the display 230 in such a CPDLC embodiment may be found in FIGS. 4-18 of U.S. Pat. No. 6,313,759, although other displays could be used in other embodiments.

Thus, the CPDLC program allows for the direct exchange of text-based messages between a controller and crewmembers on the aircraft 100. Although a CPDLC connection is established at the system level, the CPDLC application itself is a hands-on crew tool, which the crew can actively use to send response messages, request messages, and reports. The CPDLC program may be part of a larger flight information/control program such as the aircraft's Flight Management System (FMS), or it may serve as a stand-alone program.

Advantageously, the processor 200 may have the additional capability of automatically preparing and transmitting an emergency CPDLC message using the transceiver 210 based at least partly in response to receiving the emergency status signal 255. The emergency CPDLC message can be prepared and transmitted without input from the crew. Thus, the ground control station 110 or airborne control station 120 may be informed of the emergency situation even if the crew is unconscious, too busy, or otherwise unable to manually perform the functions necessary to send an emergency CPDLC message themselves.

The format of the automatically prepared emergency CPDLC message may be predetermined based upon the type of emergency that is indicated by the emergency status signal 255. Other information may be included in the emergency CPDLC message, such as information from the autopilot signal 265, and/or text information that further describes the nature of the emergency.

FIG. 3 illustrates an example output of the display device 230 that shows an automatically prepared emergency CPDLC message according to an example embodiment. The display device 230 includes buttons 305, which are labeled 1L, 2L, 3L, 4L, 5L, 6L on the left side of the display and 1R, 2R, 3R, 4R, 5R, 6R on the right side of the display. In conventional techniques that are contrary to example embodiments, the crew actively controls the preparation and transmission of CPDLC messages by manually actuating the buttons 305.

In this embodiment, it is assumed that the processor 200 has received the emergency status signal 255, which indicates that the aircraft has entered an Emergency Descent Mode. The EDM is typically associated with a sudden loss of cabin pressure, which at typical cruising altitudes may cause the crew and passengers to lose consciousness.

Upon detection of the sudden loss of cabin pressure, the autopilot 260 may automatically command the aircraft to perform flight maneuvers that place the aircraft at an altitude that allows the crew to regain consciousness, and that also reduces the risk of collision with other aircraft. For example, upon detection of a sudden loss of cabin pressure, the autopilot 260 may command the aircraft to perform an immediate 90 degree turn to the left and descend to 15000 feet. The 90 degree turn puts the aircraft at right angles to other aircraft in the same pattern, making it more visible, and at 15000 feet there is enough oxygen in the atmosphere that the crew may regain consciousness without pressurization. Of course, the autopilot may command the aircraft to make right or left turns of other than 90 degrees and to descend to an altitude other than 15000 feet. The autopilot signal 265 may include data that informs the processor 200 of what, if any, flight maneuvers have been commanded by the autopilot 260.

In response to receiving the emergency status signal 255 and the autopilot signal 265, the processor 200 may automatically prepare the CPDLC message. In the embodiment illustrated in FIG. 3, the CPDLC message includes a message element 310 (title line), message element 315 (e.g., "MAYDAY MAYDAY MAYDAY"), message element 320 (e.g., "Souls-On-Board," or "SOB"), message element 325 (e.g., "DESCEND TO"), message element 330 (Air Traffic Control (ATC) Position Report), and message element 335 (free text). Other CPDLC message elements could be formatted in any manner using any other information.

Message element 310 indicates that the CPDLC message is an emergency report page, and that the page is the first of one total page (1/1). Message element 315 suitably includes CPDLC message element 56 (e.g., "MAYDAY MAYDAY MAYDAY"). Message element 320, SOB, indicates the number of persons on the aircraft (in this example there is 35), and the SOB number may be ascertained from data that was previously entered in the FMS, perhaps during preflight procedures. Message element 325, DESCEND TO, indicates that the aircraft is descending to 15000 feet, which can be determined from the autopilot signal 265. Message element 330 suitably includes CPDLC message element 48, ATC POSITION REPORT. Message element 330 shows the last waypoint (ROSIN) and the Actual Time of Arrival (ATA) of the aircraft over that waypoint. Message element 330 additionally indicates the next waypoint after ROSIN in the flight plan (FICKY) and the Estimated Time of Arrival (ETA) over that waypoint, as well as the next waypoint after FICKY (FOOTS) and associated ETA. From the ATC POSITION REPORT, the ground control station 110 or airborne control station 120 can determine at what point in the flight plan the aircraft entered the emergency situation. Message element 335 is free text that is used to provide additional information about the nature of the emergency and of any corrective steps that were taken. In this case, message element 335 indicates that EDM was activated. Message element 335 further indicates that the autopilot initiated a 90 degree left turn to heading 270, which can be obtained from autopilot signal 265.

Since the crew is typically not involved with preparing or transmitting the emergency CPDLC message, the message does not necessarily need to be rendered on display device 230 of system 130. Such would be the case, for example, in an EDM situation where it is likely that the crew is unconscious. In fact, depending on the type of emergency, it may be advantageous not to display the automatically prepared emergency CPDLC message where the crew could see it. For example, if unauthorized individuals forcibly obtained access to the flight deck during a flight, it would be beneficial to automatically prepare and transmit an emergency CPDLC message unbeknownst to those individuals. Regardless of whether the automatically prepared emergency CPDLC message is displayed on display device 230 or not, the processor 200 can be configured with the capability of automatically preparing and transmitting the emergency CPDLC message to the ground control station 110 or the airborne control station 120 as if the crew themselves had manually used the CPDLC messaging system in the conventional manner to prepare and transmit an emergency message. At the ground control station 110 or the airborne control station 120, the relevant information contained in the emergency CPDLC message may be obtained and processed by the aircraft controller after it is received from the transceiver 210, in the usual manner.

In various embodiments, the processor 200 may have the additional capability of delaying a predetermined amount of time prior to transmitting the prepared CPDLC message. In some embodiments, the prepared CPDLC message will not be transmitted if the crew is able to recognize and correct the emergency situation during the delay. For example, the automatically prepared emergency CPDLC message illustrated in FIG. 3 may not be transmitted until, for example, 30 seconds or so has elapsed from the receipt of emergency status signal 255 at the processor 200. This delay before transmitting the emergency CPDLC message may allow the crew sufficient time to recover and correct the emergency situation themselves. In the case of the EMD scenario, the processor 200 could detect, through the autopilot signal 265, if the autopilot 260 had been manually overridden by flight control inputs from one of the crew. If the autopilot 260 was overridden prior to the elapse of the predetermined amount of time from the receipt of the emergency status signal 255, the processor 200 may cancel the transmission of the automatically prepared emergency CPDLC message. Of course, some automatically prepared emergency CPDLC messages may be sent without delay, while other emergency CPDLC messages may have different predetermined delays depending on the nature of the emergency situation that causes the automatic preparation of the emergency CPDLC message. Thus, for each automatically prepared emergency CPDLC message, the delay time that the processor 200 waits prior to transmitting the message is suitably between about 0 and about 30 seconds or so, but the delay time may also be greater than this time in other embodiments.

Figure 4:
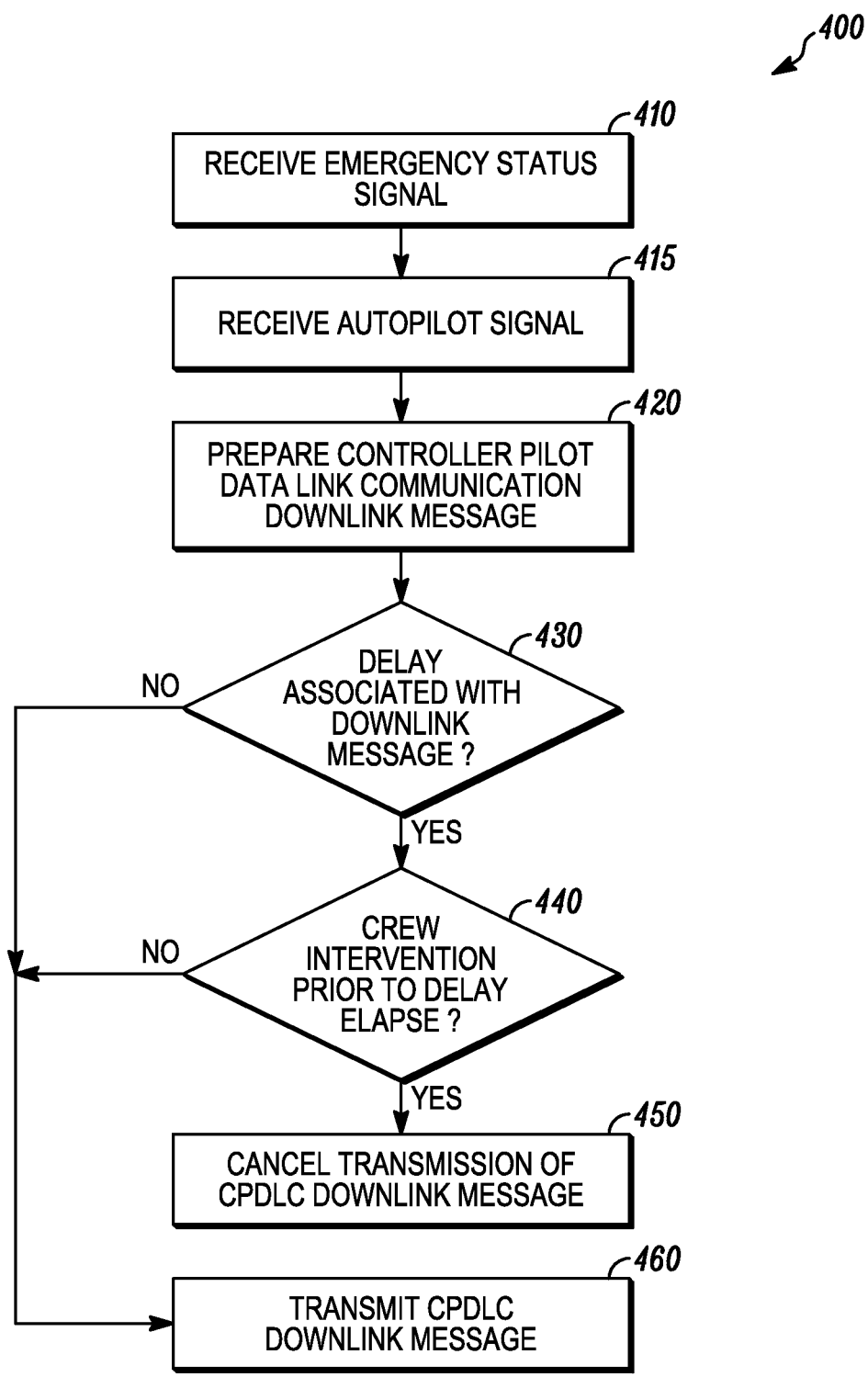
FIG. 4 is a flow diagram illustrating some processes included in a method according to an example embodiment.

FIG. 4 is a flow diagram illustrating some processes included in a method 400 according to an example embodiment. The method 400 includes, at processes 410 and 415, receiving an emergency status signal and an autopilot signal. The order of the processes 410 and 415 may be reversed, and other embodiments may not include receiving the autopilot signal.

At process 420, in response to receiving the emergency status signal and the autopilot signal, a downlink message such as a CPDLC downlink message is automatically prepared. The format of the CPDLC message may vary depending on the nature of the emergency situation, which can be determined from data contained in the emergency status signal. A format in accordance with one example embodiment was described above with reference to FIG. 3.

Next, in process 430, it is determined whether there is a transmission delay associated with the CPDLC downlink message. There may be no delay or some delay, depending on the nature of the emergency situation, which can be determined from data contained in the emergency status signal. If there is no delay, the flow jumps to process 460 where the CPDLC message is transmitted to the controller from the aircraft.

If there is a transmission delay associated with the CPDLC downlink message, the flow moves to process 440, where crew inputs are monitored. If the crew takes action prior to the delay time elapsing, the transmission of the CPDLC downlink message is cancelled in process 450. In the EDM embodiment described above, this may occur when, for some reason, an aircraft pilot is not incapacitated by the EDM event. For example, the EDM event may occur at a relatively low altitude, or the pilot may be accustomed to unassisted breathing at relatively high altitudes. At any rate, the pilot may manually command the aircraft to descend to a safer altitude, causing the transmission of the automatically prepared CPDLC downlink message to be cancelled. If no crew intervention is detected during the predetermined transmission delay period, the CPDLC downlink message is transmitted in process 460.

It will be appreciated that the question of whether or not any particular crew intervention is sufficient to cancel the automatic transmission of the emergency CPDLC message during the transmission delay period will be dependent upon the nature of the emergency situation itself. For example, a pilot may be able to adequately control a multi-engine aircraft in order to compensate for the loss of an engine and keep the plane flying safely. However, the underlying emergency situation, the loss of an engine, still exists. In another emergency situation, the crew may be able to manually lower and lock the landing gear if the hydraulic controls fail, and this would completely rectify the emergency situation of being unable to lower the landing gear. At any rate, the particular crew inputs that are sufficient to cancel the automatic emergency CPDLC message may be predefined.

Figure 5:
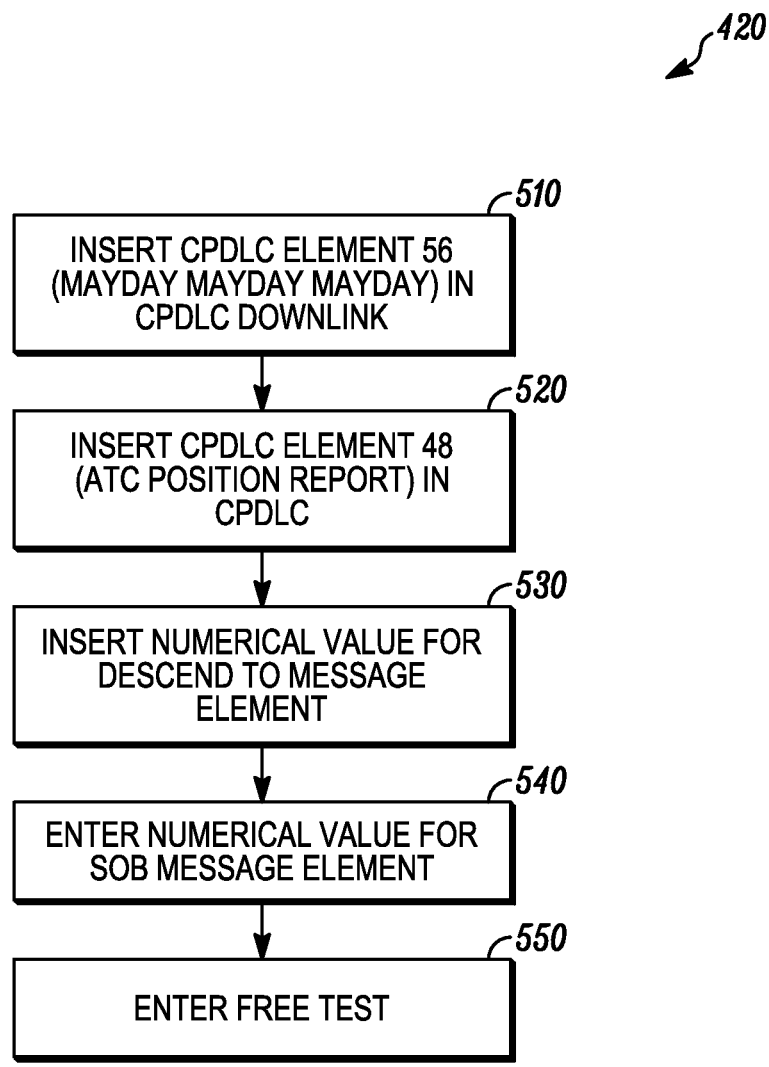
FIG. 5 is a flow diagram further illustrating the process of preparing the CPDLC communication as shown in FIG. 4.

FIG. 5 is a flow diagram further illustrating the process 420 of preparing the CPDLC communication as shown in FIG. 4. In process 510, CPDLC element 56 (e.g., "MAYDAY MAYDAY MAYDAY") is inserted into the emergency CPDLC message. In process 520, CPDLC element 48 (ATC POSITION REPORT) is inserted into the emergency CPDLC message. Next, a numerical value for the DESCEND TO message element, like message element 325 of FIG. 3, is inserted. The particular numerical value that is used for the DESCEND TO message element may be determined from the autopilot signal 265 of FIG. 2. In process 540, a numerical value for the SOB message element is inserted. The particular numerical value that is used for the SOB message element may be determined from data that was previously provided to the FMS during, for example, preflight checklist procedures. In process 550, free text is entered into the emergency CPDLC message. The free text may further describe, for example, the nature of the emergency situation and what steps, if any, that the crew and/or other aircraft systems have automatically taken to lessen or eliminate the emergency situation. It will be appreciated that the order in which the processes 510 to 550 occur is not particularly important and that in an alternative embodiment, they may occur in a different sequence.

While at least one example embodiment has been presented in the foregoing detailed description, it should be appreciated that a vast number of variations exist. It should also be appreciated that the example embodiment or example embodiments are not intended to limit the scope, applicability, or configuration of the invention in any way. Rather, the foregoing detailed description will provide those skilled in the art with a convenient road map for implementing the inventive aspects that may be found in at least one embodiment. The subject matter of the invention includes all combinations and subcombinations of the various elements, features, functions and/or properties disclosed in the example embodiments. It should be further understood that various changes can be made in the function and arrangement of elements without departing from the scope of the invention as set forth in the appended claims and the legal equivalents thereof.

The invention claimed is:

1. A method comprising:
receiving an emergency status signal indicating that an aircraft is in an emergency condition;
formatting a downlink message by a processor in response to receiving the emergency status signal, the downlink message describing the emergency condition and an autopilot response to the emergency condition; and transmitting the downlink message to a controller of the aircraft.

2. The method of claim 1, wherein the emergency condition is an Emergency Descent Mode (EDM).

3. The method of claim 1, further comprising monitoring for a safe signal, the safe signal indicative that an aircraft crewmember has manually responded to the emergency condition.

4. The method of claim 3, wherein transmitting the downlink message comprises transmitting the downlink message after a time interval measured from receiving the emergency status signal has elapsed and in response to determining that the safe signal was not received during the time interval.

5. The method of claim 1, wherein the downlink message comprises a Controller Pilot Data Link Communication (CPDLC) emergency report.

6. The method of claim 5, wherein the CPDLC emergency report comprises a MAYDAY message element.

7. The method of claim 6, wherein the CPDLC emergency report further comprises an Air Traffic Control (ATC) Position Report.

8. An aircraft communication system comprising:
an emergency status indicator;
a processor coupled to the emergency status indicator, the processor configured to prepare an emergency Controller Pilot Data Link Communication (CPDLC) message in response to receiving an emergency status signal from the emergency status indicator, the emergency CPDLC message comprising data that describes an autopilot command generated in response to the emergency; and
a transceiver coupled to the processor, the transceiver configured to receive the emergency CPDLC message from the processor and transmit the emergency CPDLC message to an aircraft controller station.

9. The aircraft communication system of claim 8, further comprising an autopilot coupled to the processor, the processor configured to receive an autopilot signal from the autopilot.

10. The aircraft communication system of claim 9, the emergency CPDLC message comprising data that describes an emergency that prompted the emergency status signal.

11. The aircraft communication system of claim 8, the emergency comprising a loss of cabin pressure.

12. The aircraft communication system of claim 9, further comprising an input interface coupled to the processor, the input interface configured to allow an operator of the aircraft to input data to the processor.

13. The aircraft communication system of claim 12, further comprising a display device coupled to the processor, the display device configured to visually prompt and notify the operator of relevant data.

14. A processor-readable non-transient storage medium, that when read, causes a processor in an aircraft to perform functions comprising:
preparing a Controller Pilot Data Link Communication (CPDLC) message in response to receiving an emergency status signal including text that indicates an Emergency Descent Mode has been activated; and
transmitting the CPDLC message.

15. The processor-readable medium of claim 14, wherein transmitting the CPDLC message comprises waiting a predetermined amount of time prior to transmitting the CPDLC message.

16. The processor-readable medium of claim 14, wherein preparing the CPDLC message comprises inserting text that indicates an Emergency Descent Mode has been activated.

17. The processor-readable medium of claim 16, wherein preparing the CPDLC message further comprises inserting text that indicates a number of Souls On Board (SOB) the aircraft.

18. The processor-readable medium of claim 17, wherein preparing the CPDLC message further comprises inserting text that indicates an altitude that the aircraft was commanded to descend to by an autopilot.

19. The processor-readable medium of claim 18, wherein preparing the CPDLC message further comprises inserting text that indicates a new heading that the aircraft was commanded to follow by the autopilot.

* * * * *